(12) United States Patent  (10) Patent No.: US 7,633,703 B2
Ota  (45) Date of Patent: Dec. 15, 2009

(54) MEASURING METHOD OF FLYING HEIGHT AND MAGNETIC DISK DRIVE APPARATUS CAPABLE OF ADJUSTING FLYING HEIGHT

(75) Inventor: Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/837,250

(22) Filed: Aug. 10, 2007

(65) Prior Publication Data

US 2008/0043355 A1 Feb. 21, 2008

(30) Foreign Application Priority Data

Aug. 18, 2006 (JP) ............................. 2006-223220

(51) Int. Cl.
G11B 21/02 (2006.01)
G11B 27/36 (2006.01)
(52) U.S. Cl. .......................................... 360/75; 360/31
(58) Field of Classification Search ....................... None
See application file for complete search history.

(56) References Cited

U.S. PATENT DOCUMENTS

| 4,146,911 | A | * | 3/1979 | Gyi et al. ....................... 360/75 |
| 4,777,544 | A | * | 10/1988 | Brown et al. .................. 360/75 |
| 5,729,399 | A | * | 3/1998 | Albrecht et al. ............... 360/75 |
| 5,751,510 | A | * | 5/1998 | Smith et al. ................... 360/67 |
| 5,991,113 | A | | 11/1999 | Meyer et al. |
| 6,600,622 | B1 | * | 7/2003 | Smith ....................... 360/77.06 |
| 6,963,464 | B2 | * | 11/2005 | Xu et al. ........................ 360/75 |
| 6,972,919 | B2 | * | 12/2005 | Suk .............................. 360/75 |
| 6,999,265 | B1 | | 2/2006 | Schreck et al. |
| 7,023,645 | B1 | | 4/2006 | Emo et al. |
| 7,042,674 | B1 | | 5/2006 | Baril et al. |
| 7,092,194 | B2 | * | 8/2006 | Meyer ........................... 360/75 |
| 7,119,979 | B2 | * | 10/2006 | Fong et al. ..................... 360/75 |
| 7,180,692 | B1 | * | 2/2007 | Che et al. ...................... 360/31 |
| 7,292,401 | B2 | * | 11/2007 | Shen et al. ..................... 360/69 |
| 7,426,619 | B2 | * | 9/2008 | Tsuge et al. .................. 711/165 |
| 7,509,728 | B1 | * | 3/2009 | Schreck et al. ............ 29/603.03 |

FOREIGN PATENT DOCUMENTS

| JP | A-06-150522 | 5/1994 |
| JP | A-06-176557 | 6/1994 |
| JP | A-09-063220 | 3/1997 |
| JP | A-10-177774 | 6/1998 |
| JP | A-10-222945 | 8/1998 |
| JP | A-2004-234792 | 8/2004 |

* cited by examiner

Primary Examiner—K. Wong
(74) Attorney, Agent, or Firm—Oliff & Berridge, PLC

(57) ABSTRACT

A method of measuring a flying height of a thin-film magnetic head, capable of measuring the flying height without using a new component, such as an atmospheric pressure sensor, which is adverse to a requirement of reduction in cost and size. The method of measuring a flying height includes causing a thin-film magnetic head including a read head element receiving a signal magnetic field from a magnetic disk to contact the rotating magnetic disk temporarily; and measuring a flying height of the thin-film magnetic head by measuring outputs from the read head element at a time of the contact and during flying of the thin-film magnetic head.

17 Claims, 8 Drawing Sheets

MEASURING METHOD OF FLYING HEIGHT AND MAGNETIC DISK DRIVE APPARATUS CAPABLE OF ADJUSTING FLYING HEIGHT

PRIORITY CLAIM

This application claims priority from Japanese patent application No. 2006-223220, filed on Aug. 18, 2006, which is incorporated herein by reference.

BACKGROUND OF THE INVENTION

1. Field of the Invention

The present invention relates to a measuring method of flying height of a thin-film magnetic head, which is flying above a rotating magnetic disk, and a magnetic recording and reproducing method using the measuring method of flying height in a magnetic disk drive apparatus. Further, the present invention relates to a magnetic disk drive apparatus for carrying out the measuring method of flying height and the magnetic recording and reproducing method.

2. Description of the Related Art

The thin-film magnetic head included by a magnetic disk drive apparatus hydrodynamically flies with a predetermined gap (flying height) above a magnetic disk, which is a rotating magnetic recording medium, when writing and reading a signal. In this flying state, the thin-film magnetic head writes data signals by applying a signal magnetic field to the magnetic disk by using an electromagnetic coil element, and reads data signals by receiving a signal magnetic field from the magnetic disk by using a magnetoresistive (MR) effect element.

In correspondence with increase in recording density accompanying increase in capacity and reduction in size of magnetic disk drive apparatuses in recent years, the track width of thin-film magnetic heads is set at a smaller value. In order to avoid reduction in writing and reading ability apprehended due to this reduction in the track width, the flying height is reduced more in recent magnetic disk drive apparatuses, and the flying height is actually set at about 10 nm or less.

The flying height having such an extremely small value needs to be controlled stably for avoiding a thermal asperity and crash and for keeping favorable write and read characteristics. As a control method of the flying height, for example, U.S. Pat. No. 5,991,113 discloses the art for adjusting flying height by providing a heating element in a thin-film magnetic head, and by causing a head element end to protrude toward a magnetic disk by the heat generated from the heating element.

As the flying height has such an extremely small value, the influence of the ambient temperature and atmospheric pressure inside the magnetic disk drive apparatus becomes considerably large. Thus, as a countermeasure against the change in flying height due to ambient temperature, the ambient temperature is measured by providing a temperature sensor in the magnetic disk drive apparatus, and based on the measurement value of the temperature, the control of supplying the electric power to the above described heating element for flying height adjustment is performed, for example.

Meanwhile, the atmospheric pressure in the magnetic disk drive apparatus changes in accordance with the use of the apparatus, for example, in a highland and or in an airplane. As the countermeasures against the change in flying height by the atmospheric pressure, for example, Japanese Patent Publications Nos. 10-177774A and 6-150522A disclose the arts in which the flying height is controlled by changing the rotational frequencies of the magnetic disks based on signals from atmospheric sensors. In the art disclosed in Japanese Patent Publication No. 6-176557A, a magnetic disk drive apparatus, provided with a heater, a cooling fan and fin, and a pressure sensor, is sealed in a sealed glass container, whereby the pressure change inside the container is adjusted by controlling temperature, and thus, the flying height change due to a pressure change is suppressed. Further, Japanese Patent Publication No. 10-222945A discloses the art of checking a flying margin by controlling the atmospheric pressure by containing the magnetic disk drive apparatus in a closed chamber adjustable in atmospheric pressure.

However, in the prior arts which take measures against the flying height change due to atmospheric pressure, various problems have not been solved yet.

For example, in the arts disclosed in Japanese Patent Publications Nos. 10-177774A and 6-150522A, pressure sensors are required. However, installation of a pressure sensor considerably raises the cost of the apparatus though its use frequency is not so high as that of a temperature sensor in consideration of the ordinary use environment. Therefore, it reduces the cost performance. The arts disclosed in Japanese Patent Publications Nos. 10-177774A and 6-150522A intend to control the flying height by changing the rotational frequency of the magnetic disk, however the rotational frequency originally specifies the recording capacity and transfer speed, and it is not preferable to change the rotational frequency based on the other reasons.

Further, the arts of Japanese Patent Publications Nos. 6-176557A and 10-222945A require a large-scaled mechanism such as a closed container for sealing the magnetic disk drive apparatus in, and the pressure adjusting means, in order to measure the flying height and perform proper magnetic recording, which are adverse to the requirement for reduction in cost and size of magnetic disk drive apparatuses.

BRIEF SUMMARY OF THE INVENTION

Accordingly, an object of the present invention is to provide a measuring method of flying height of a thin-film magnetic head, capable of measuring the flying height without using a new component, such as an atmospheric pressure sensor, adverse to a requirement of reduction in cost and size, and to provide a magnetic recording and reproducing method which can adjust the flying height in correspondence with a change in flying height due to atmospheric pressure by using the measuring method of flying height.

Further, an object of the present invention is to provide a thin-film magnetic head used for carrying out the measuring method of flying height and the magnetic recording and reproducing method, an HGA including the thin-film magnetic head, and a magnetic disk drive apparatus including the HGA.

Before describing the present invention, the terms used in the specification will be defined. In the stacked structure of the magnetic head element formed on the element formation surface of a substrate, the component which is on the substrate side of a reference layer is described as being "under", or "below" the reference layer, and the component which is on the side in the stacking direction of the reference layer is described as being "on" or "above" the reference layer. For example, "the lower magnetic layer is provided on the insulating layer" means that the lower magnetic layer is provided on the side in the stacking direction of the insulating layer.

According to the present invention, a measuring method of flying height of a thin-film magnetic head is provided, which comprises the steps of:

causing a thin-film magnetic head including a read head element receiving a signal magnetic field from a magnetic disk to contact the rotating magnetic disk temporarily; and measuring a flying height of the thin-film magnetic head by measuring outputs from the read head element at a time of the contact and during flying of the thin-film magnetic head.

In this measuring method of flying height, a flying height, which includes all the influences of the environmental parameters such as atmospheric pressure, is directly measured by using the outputs at a time of contact and during flying from the read head element, without measuring each of the values of the environmental parameters. Therefore, the proper measurement of the flying height can be performed without using a new component, such as an atmospheric pressure sensor, adverse to a requirement of reduction in cost and size.

In the measuring method of flying height according to the present invention, the flying height of the thin-film magnetic head, which changes depending on atmospheric pressure in a use environment of an apparatus provided with the thin-film magnetic head, can be measured. Further, the thin-film magnetic head is preferably caused to contact the magnetic disk by supplying electric power to a flying-height adjusting element provided within the thin-film magnetic head or mounted to the thin-film magnetic head. Here, a heating part is preferably used as the flying-height adjusting element.

According to the present invention, a magnetic recording and reproducing method is further provided, which comprises the steps of:

measuring a flying height of the thin-film magnetic head by using the measuring method of flying height described above;

adjusting the flying height of the thin-film magnetic head to a predetermined value based on the measured value of the flying height; and performing read and/or write operation by using the thin-film magnetic head.

In this magnetic recording and reproducing method, the flying height of the thin-film magnetic head is properly measured without using a new component adverse to a requirement of reduction in cost and size, the stable and desired flying height is realized, and then, adequate read and write operations can be performed. As a result, the stable and excellent recording and reproducing characteristics can be realized, independently of a use environment.

In the magnetic recording and reproducing method according to the present invention, a temperature within an apparatus provided with at least one the thin-film magnetic head is preferably measured during measuring the flying height and during adjusting the flying height, and then, based on the measured values of the temperature and the measured value of the flying height, the flying height of the thin-film magnetic head is preferably adjusted to a predetermined value.

Further, in the magnetic recording and reproducing method according to the present invention, the flying height of the thin-film magnetic head is preferably adjusted, based further on the amount of protrusion during writing by a heat generated from an electromagnetic coil element comprised by the thin-film magnetic head.

Further, it is also preferable that the adjustment of the flying height is performed by controlling an electric power inputted to a flying-height adjusting element provided within the thin-film magnetic head or mounted to the thin-film magnetic head, and on controlling the electric power, a control table is used, which describes a relationship between the electric power and the flying height of the thin-film magnetic head at various temperatures within the apparatus. In the case, the control table is preferably updated by using the measured value of the flying height, and a heating part is preferably used as the flying-height adjusting element.

Further, in the magnetic recording and reproducing method according to the present invention, it is also preferable that the flying height of the thin-film magnetic head, which changes depending on atmospheric pressure in a use environment of an apparatus provided with the thin-film magnetic head, is measured, the flying height of the thin-film magnetic head is adjusted to a predetermined value based on the measured value of the flying height, a change of the flying height by the atmospheric pressure is compensated, and then, the read and/or write operation is performed.

According to the present invention, a magnetic disk drive apparatus is further provided, which comprises: at least one magnetic disk; and at least one head gimbal assembly (HGA), the HGA comprising;

a thin-film magnetic head comprising: a read head element for receiving a signal magnetic field from the magnetic disk; and a write head element for generating a signal magnetic field to perform write operation to the magnetic disk; and a flying-height adjusting element provided within the thin-film magnetic head or mounted to the thin-film magnetic head, for adjusting a spacing between a surface of the magnetic disk and ends of the read head element and the write head element, the magnetic disk drive apparatus further comprising a control circuit for controlling write and read operations performed to the magnetic disk by the thin-film magnetic head and for controlling an adjusting operation of the flying-height adjusting element, and the at least one magnetic disk including at least one contact lane on a surface portion of itself which the thin-film magnetic head contacts when measuring the flying height.

In this above-described magnetic disk drive apparatus, by providing the contact lane on the proper area of the magnetic disk surface, excessive abrasion and damage of the magnetic disk and the head at the time of contact (touchdown) of the thin-film magnetic head on the occasion of the flying height measurement can be prevented. That is, obtained is a magnetic disk drive apparatus suitable for carrying out the above described measuring method of flying height and the above described magnetic recording and reproducing method.

In the above-described magnetic disk drive apparatus according to the present invention, the at least one contact lane is preferably provided in a region other than data signal regions and servo signal regions on the magnetic disk. Further, a surface of the contact lane is preferably a surface to which embossing work or surface-roughening work is applied.

Further, the thin-film magnetic head comprises an abrasion-proof treatment portion to which abrasion-proof treatment is preferably applied, in a contact portion of the thin-film magnetic head when contacting the magnetic disk for measuring the flying height. Here, the abrasion-proof treatment portion is preferably formed by applying embossing work or surface-roughening work to the contact portion.

Further, in the above-described magnetic disk drive apparatus according to the present invention, the flying-height adjusting element is preferably a heating part provided within the thin-film magnetic head.

Further objects and advantages of the present invention will be apparent from the following description of preferred embodiments of the invention as illustrated in the accompanying drawings.

DETAILED DESCRIPTION OF THE INVENTION

Figure 1:
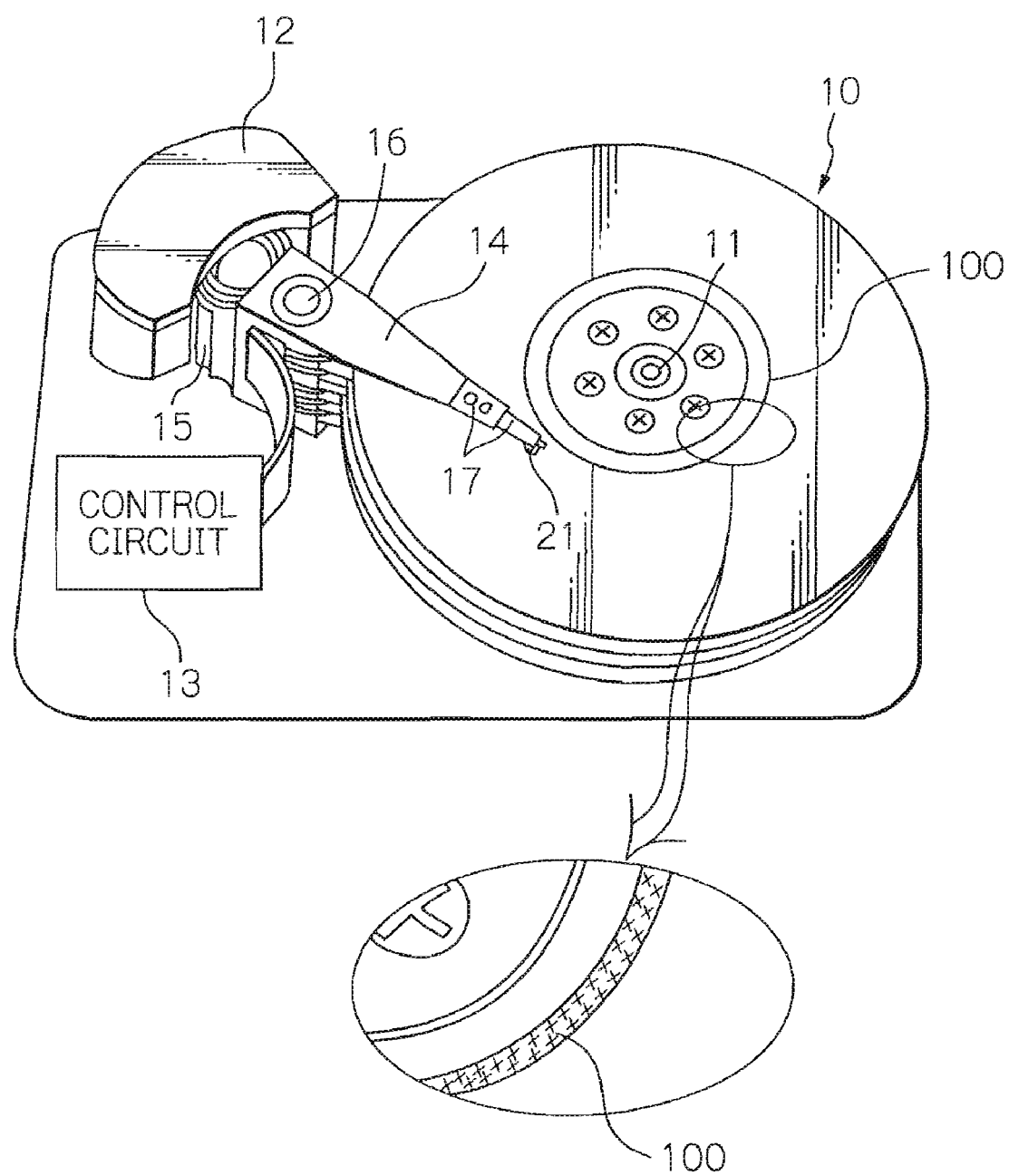
FIG. 1 shows a perspective view schematically illustrating a main part of one embodiment of the magnetic disk drive apparatus according to the present invention.

FIG. 1 shows a perspective view schematically illustrating a main part of one embodiment of the magnetic disk drive apparatus according to the present invention.

In FIG. 1, reference numeral 10 denotes magnetic disks as a plurality of magnetic recording media rotating around a rotary shaft of a spindle motor 11, reference numeral 12 denotes an assembly carriage device for positioning a thin-film magnetic head (slider) 21 above a track, and reference numeral 13 denotes a recording/reproducing and flying-height control circuit for controlling write and read operations of the thin-film magnetic head and further controlling a flying-height adjusting operation of a flying-height adjusting element which will be described later.

The assembly carriage device 12 is provided with a plurality of drive arms 14. These drive arms 14 are angularly oscillatable around a pivot bearing axis 16 by a voice coil motor (VCM) 15, and are stacked in the direction along the axis 16. An HGA 17 is mounted to a tip end portion of each of the drive arms 14. A thin-film magnetic head 21 is provided at each of the HGAs 17 so as to be opposed to the surface of each of the magnetic disks 10. The number of the magnetic disks 10, the drive arm 14, the HGAs 17 and the thin-film magnetic heads 21 may be one.

The magnetic disk 10 includes a contact lane 100 on a surface portion of itself which the thin-film magnetic head 21 contacts (touches down) on the occasion of measuring the flying height prior to a write and/or read operation, as will be described in detail later. The contact lane 100 is specially provided as the portion for causing the thin-film magnetic head 21 to touch down to measure the flying height. The contact lane 100 is provided in the region other than signal record regions such as data signal regions and servo signal regions on the magnetic disk, and data signals for confirming the flying height is recorded therein. The surface of the contact lane 100 may be the surface to which abrasion proof treatment such as microscopically embossing work or surface-roughening work is applied. Such work can be performed by irradiating ion beams, for example.

By providing such a contact lane 100, excessive abrasion of the magnetic disk and the head at the time of touchdown of the thin-film magnetic head 21 can be prevented, and the magnetic disk drive apparatus which is extremely suitable for carrying out a measuring method of flying height and a magnetic recording and reproducing method, which will be described in detail later, is realized.

The placement position of the contact lane 100 may be any of an inner peripheral side, an outer peripheral side or an intermediate position of them of the magnetic disk 10. Further, the contact lanes may be provided at the inner peripheral side and the outer peripheral side of the magnetic disk 10 respectively, to measure the difference of flying height due to the difference of the linear velocities at the inner and outer peripheries. Further, a plurality of contact lanes may be provided in the magnetic disk 10.

Figure 2:
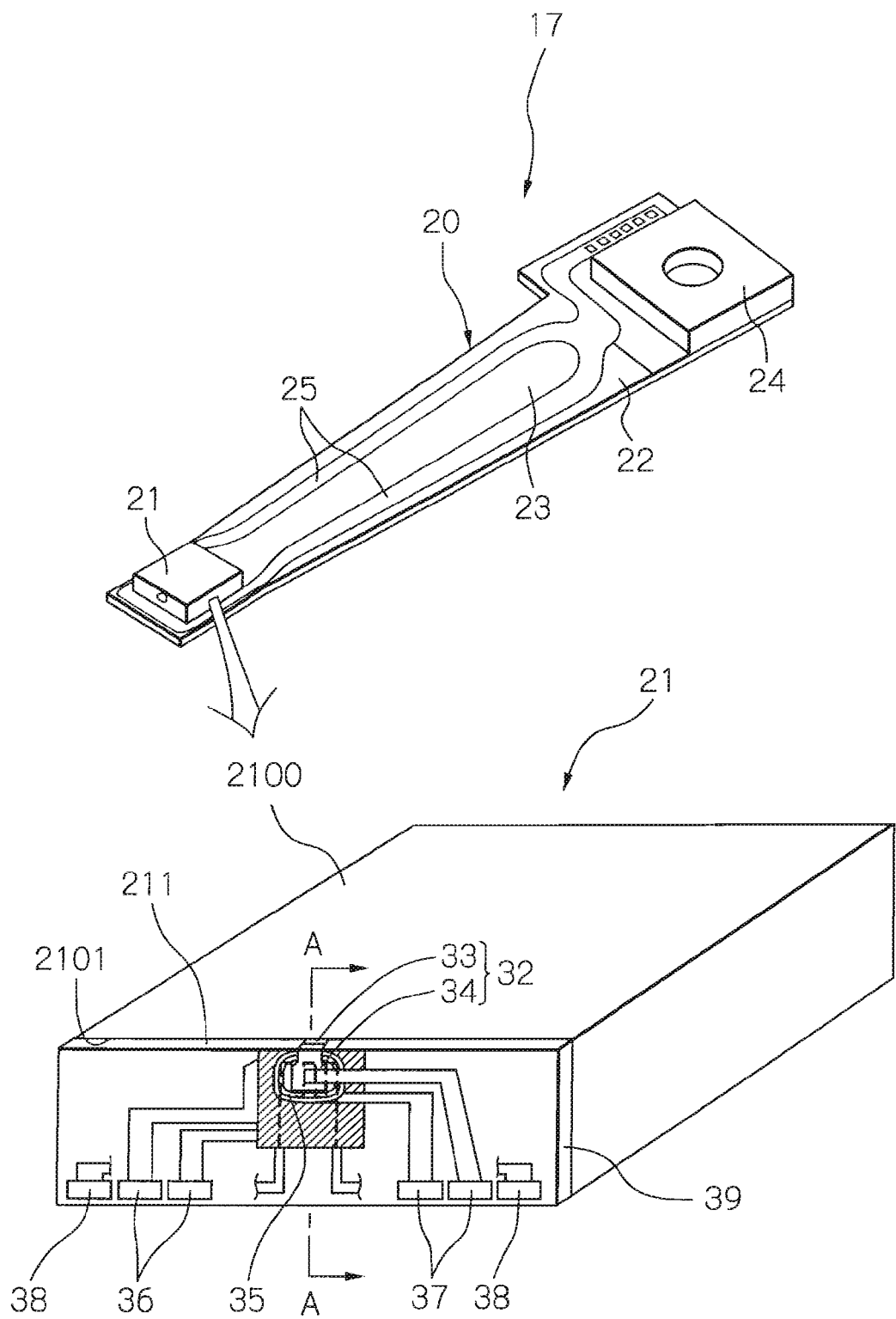
FIG. 2 shows a perspective view illustrating one embodiment of the HGA according to the present invention, and the thin-film magnetic head fitted to the tip end portion of the HGA.

FIG. 2 shows a perspective view illustrating one embodiment of the HGA according to the present invention, and the thin-film magnetic head fitted to the tip end portion of the HGA.

According to FIG. 2, the HGA 17 is constituted by fixing and supporting a thin-film magnetic head (slider) 21 having a magnetic head element to the tip end portion of a suspension 20, and by electrically connecting one end of a wiring member 25 to terminal electrodes of the thin-film magnetic head 21.

The suspension 20 is mainly constituted of a load beam 22, a flexure 23 having elasticity fixed and supported on the load beam 22, a base plate 24 provided at a base portion of the load beam 22, and the wiring member 25 provided on the flexure 23 and constituted of lead conductors and connecting pads electrically connected to both ends of each of the lead conductors. Though not illustrated, a head drive IC chip may be fitted at the midpoint of the suspension 20. Further, a micro actuator such as an electrostrictive element may be provided between the suspension 20 and the thin-film magnetic head 21 as will be described later by using FIG. 3.

In FIG. 2, the thin-film magnetic head 21 includes an air bearing surface (ABS) 2100 worked to obtain suitable flying height, a magnetic head element 32 provided on an element formation surface 2101, a heating part 35 as a flying-height adjusting element which is also provided on the element formation surface 2101, an overcoat layer 39 provided on the element formation surface 2101 to cover the magnetic head element 32 and the heating part 35, two signal electrodes 36 and two signal electrodes 37 exposed from the layer surface of the overcoat layer 39, and two drive electrodes 38. Here, the magnetic head element 32 is constituted of an MR effect element 33 which is a read head element for reading data signals, and an electromagnetic coil element 34 which is a write head element for writing data signals. The signal electrodes 36 and 37 are connected to the MR effect element 33 and the electromagnetic coil element 34, respectively. The drive electrodes 38 are connected to the heating part 35.

In the MR effect element 33 and the electromagnetic coil element 34, one end of each of the elements reaches a slider end surface 211. Here, the slider end surface 211 is the surface other than the ABS 2100 in the opposed-to-medium surface of the thin-film magnetic head 21, which is opposed to the magnetic disk and is mainly constituted of an end surface of the overcoat layer 39. By one end of each of these elements being opposed to the magnetic disk, the reading data signals by sensing the signal magnetic field and the writing data signals by applying the signal magnetic field are performed.

The heating part 35 is positioned between the MR effect element 33 and the electromagnetic coil element 34 in FIG. 2, and is provided for adjusting the flying height of the thin-film magnetic head 21 with respect to the magnetic disk 10, and generates heat by being energized. The magnetic head element 32 protrudes in the direction of the magnetic disk surface in such a manner as to raise the slider end surface 211 by the magnetic head element 32 itself being thermally expanded due to the heat generated from the heating part 35, or being protruded by heat expansion of the surrounding material. By controlling the protruding motion with the energization amount to the heating part 35, the flying height becomes adjustable.

The two drive electrodes 38 are arranged at both sides of the group of the four signal electrodes 36 and 37. This is the arrangement that can prevent crosstalk between the wiring of the MR effect element 33 and the wiring of the electromagnetic coil element 34 as described in Japanese Patent Publication No. 2004-234792A. However, when predetermined crosstalk is allowed, the two drive electrodes 38 may be respectively arranged among the four signal electrodes 36 and 37. The number of these electrodes is not limited to the mode of FIG. 2. In FIG. 2, the number of electrodes is six in total, but, the mode of using, for example, one drive electrode, and five electrodes in total, and establishing a ground on a slider substrate may be adopted.

Figure 3:
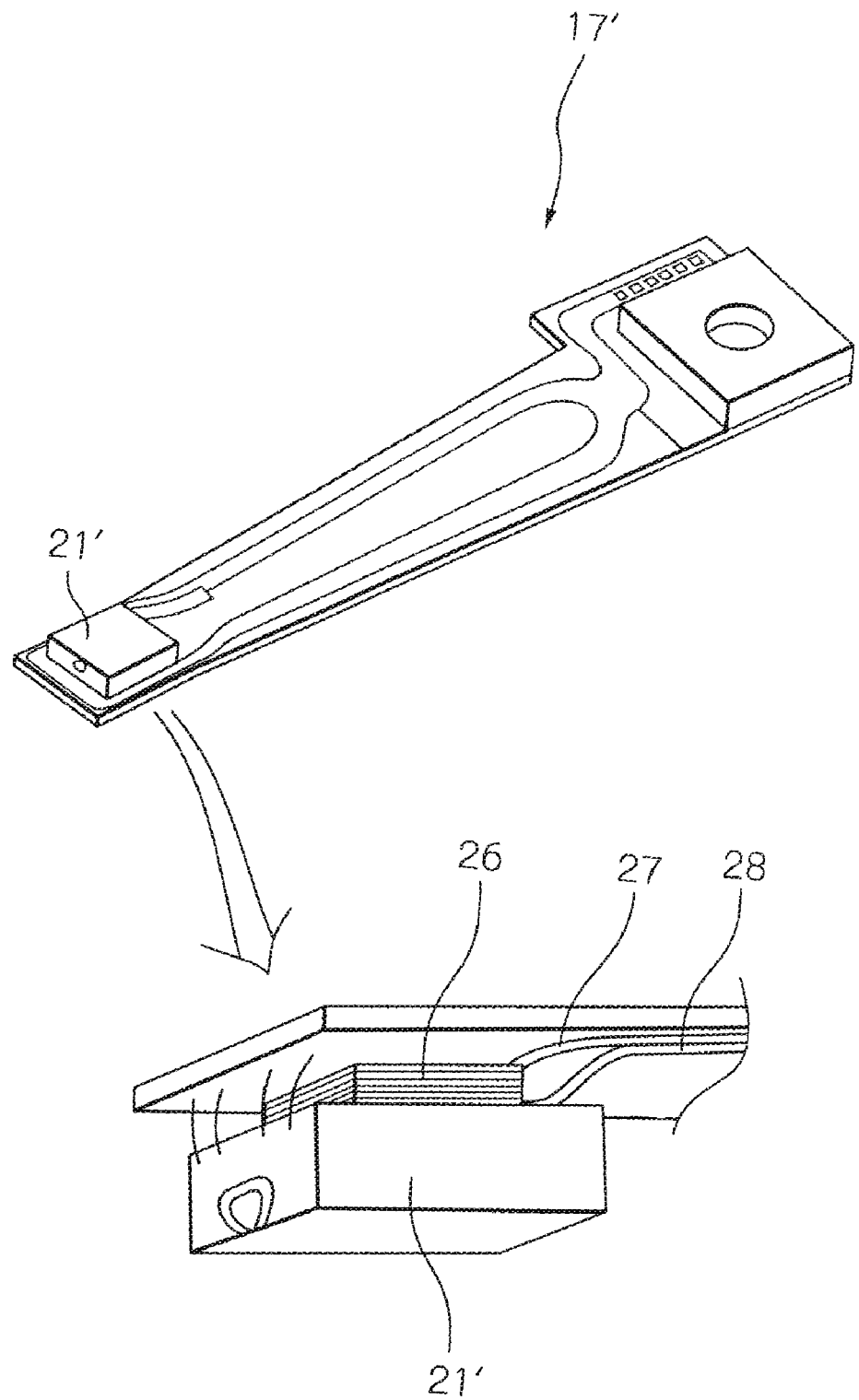
FIG. 3 shows a perspective view illustrating another embodiment of the HGA according to the present invention.

One embodiment of the HGA 17 and the thin-film magnetic head 21 is described above, but the HGA of the present invention is not limited to the embodiment as a matter of course. FIG. 3 shows a perspective view illustrating another embodiment of the HGA according to the present invention.

According to FIG. 3, a thin-film magnetic head 21' is fitted to a tip end portion of an HGA 17' via an electrostrictive element 26 as the flying-height adjusting element. The electrostrictive element 26 has the structure as a micro actuator, and is formed of a ferroelectric layer made of a material such as $BaTiO_3$ or PZT ($PbZrO_3$—$PbTiO_3$), or a multilayer of them. Further, lead wires 27 and 28 provided in the wiring member 25 or along the wiring member 25 are connected to both end surfaces of the electrostrictive element 26, respectively. The thickness of the electrostrictive element 26 is increased by applying a predetermined voltage between the lead wires 27 and 28. And thus, by the entire thin-film magnetic head 21 moving in the magnetic disk direction, the flying height can be changed. On this occasion, the flying height becomes controllable in accordance with the applied voltage value.

Further, by driving the electrostrictive element 26, an intentional contact (touchdown) operation of the thin-film magnetic head at the time of flying height measurement, which will be described in detail later, can be performed.

Further, the flying height can be adjusted by using a magnetostrictive element instead of the electrostrictive element. In the case of the above embodiment, a heating part may not be provided in the thin-film magnetic head 21'.

Figure 4A:
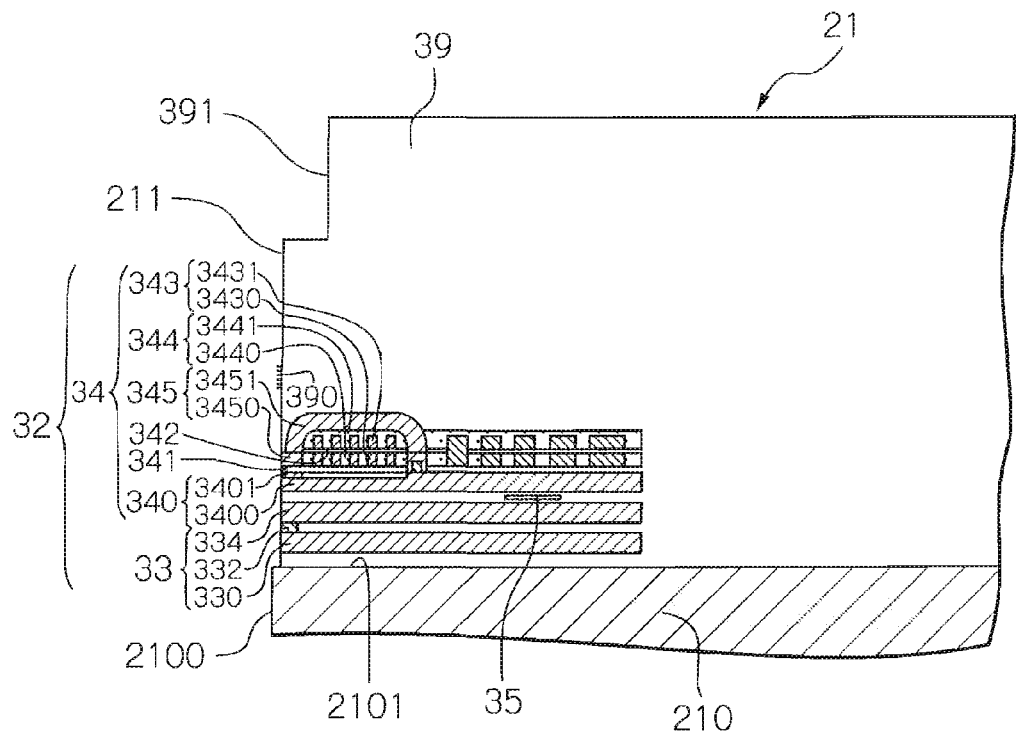
FIG. 4a shows a sectional view taken along the A-A line of FIG. 2, illustrating a main part of one embodiment of the thin-film magnetic head 21 according to the present invention.
Figure 4B:
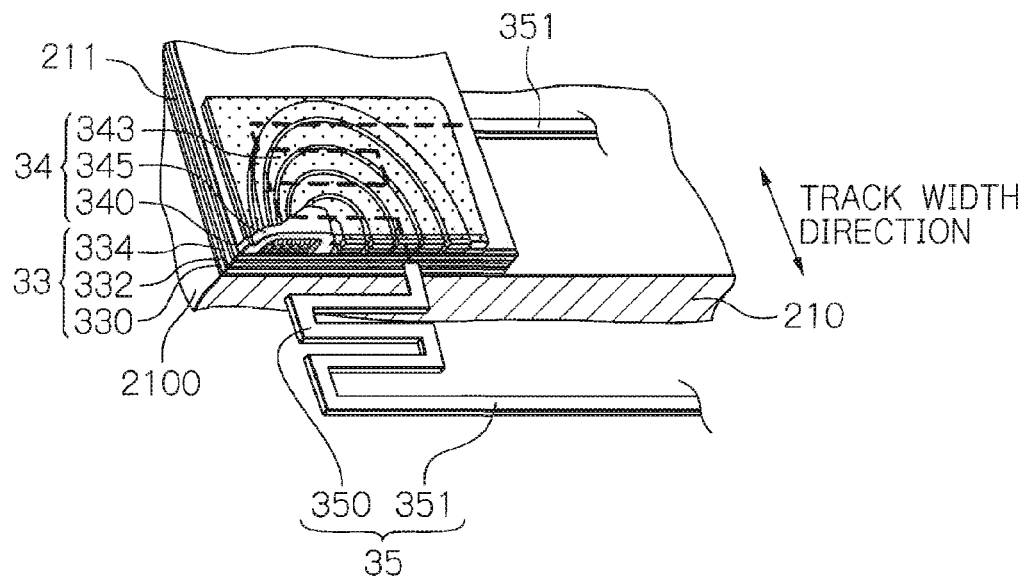
FIG. 4b shows a perspective view including the cross-section in FIG. 4a taken along the A-A line.

FIG. 4a shows a sectional view taken along the A-A line of FIG. 2, illustrating a main part of one embodiment of the thin-film magnetic head 21 according to the present invention. FIG. 4b shows a perspective view including the cross-section in FIG. 4a taken along the A-A line.

In FIG. 4a, reference numeral 210 denotes a slider substrate constituted of AlTiC ($Al_2O_3$—TiC) or the like, which has the ABS 2100 opposed to the magnetic disk surface. On the element formation surface 2101 which is one side surface when the ABS 2100 of the slider substrate 210 is the bottom surface, the MR effect element 33, the electromagnetic coil element 34, the heating part 35, and the overcoat layer 39 which protects these elements are mainly formed. An abrasion proof treatment portion 390 is formed on a portion of the slider end surface 211 which contacts the magnetic disk on the occasion of measurement of the flying height, which will be described in detail later.

The MR effect element 33 includes an MR effect multilayer 332, a lower shield layer 330 and an upper shield layer 334 which are disposed at the positions sandwiching the multilayer. The lower shield layer 330 and the upper shield layer 334 can be constituted of NiFe (permalloy or the like), CoFeNi, CoFe, FeN, FeZrN or the like with a thickness of about 0.1 to 3 μm formed by using, for example, a pattern plating method including a frame plating method.

The MR effect multilayer 332 includes a current-in-plane (CIP) giant magnetoresistive (GMR) multilayer film, a current-perpendicular-to-plain (CPP) GMR multilayer film, or a tunnel magnetoresistive (TMR) multilayer film, and receives a signal magnetic field from a magnetic disk with very high sensitivity. The upper and lower shield layers 334 and 330 prevent the MR effect multilayer 332 from receiving an influence of an external magnetic field which becomes noise.

When the MR effect multilayer 332 includes a CIP-GMR multilayer film, upper and lower shield gap layers for insulation are respectively provided between the MR effect multilayer 332 and each of the upper and lower shield layers 334 and 330. Further, an MR lead conductor layer for supplying a sense current to the MR effect multilayer 332 and taking out reproduction output is formed. On the other hand, when the MR effect multilayer 332 includes the CPP-GMR multilayer film or the TMR multilayer film, the upper and lower shield layers 334 and 330 also function as the upper and lower electrode layers respectively. In this case, the upper and lower shield gap layers and the MR lead conductor layer are not required and are omitted. Though not illustrated, an insulating layer is formed between the shield layers and on the opposite side to the slider end surface 211 of the MR effect multilayer 332. Further, insulating layers, or bias insulating layers and hard bias layers formed of a ferromagnetic material for applying a longitudinal bias magnetic field for stabilizing magnetic domains are formed on both sides of the MR effect multilayer 332 in the track width direction.

In the case of including, for example, a TMR effect multilayer film, the MR effect multilayer 332 has the structure in which sequentially stacked are: an antiferromagnetic layer with a thickness of about 5 to 15 nm constituted of IrMn, PtMn, NiMn, RuRhMn or the like; a pinned layer constituted of a ferromagnetic material such as CoFe or of two layers formed of CoFe or the like sandwiching, for example, a non-magnetic metal layer of Ru or the like, and having a magnetizing direction fixed by the anti-ferromagnetic layer; a tunnel barrier layer constituted of a non-magnetic dielectric material made by oxidizing a metal film with a thickness of about 0.5 to 1 nm constituted of, for example, Al, AlCu or Mg by oxygen introduced into a vacuum device or natural oxidation; and a free layer constituted of two layers formed respectively of a ferromagnetic material such as CoFe with a thickness of about 1 nm and of a ferromagnetic material such as NiFe or the like with a thickness of about 3 to 4 nm, and making a tunnel exchange coupling with the pinned layer through the tunnel barrier layer.

The electromagnetic coil element 34 is for longitudinal magnetic recording, and includes a lower magnetic pole layer 340, a write gap layer 341, a write coil layer 343, a write coil insulating layer 344 and an upper magnetic pole layer 345. The write coil layer 343 has a two-layered structure of a lower write coil layer 3430 and an upper write coil layer 3431, and is formed so as to pass at least between the lower magnetic pole layer 340 and the upper magnetic pole layer 345 during one turn. The lower magnetic pole layer 340 and the upper magnetic pole layer 345 become magnetic permeation path for the magnetic flux generated by energization to the write coil layer 343.

Here, the lower magnetic pole layer 340 includes: a lower yoke layer 3400; and a lower magnetic pole part 3401 which is formed on the end portion on the ABS 2100 side (on the slider end surface 211 side) of the lower yoke layer 3400, reaches the slider end surface 211, and has a top surface in contact with the write gap layer 341. The lower yoke layer 3400 is constituted of NiFe, CoFeNi, CoFe, FeN, FeZrN or the like with a thickness of about 0.1 to 3.5 µm formed by using, for example, a sputtering method or a pattern plating method including a frame plating method. The lower magnetic pole part 3401 is constituted of NiFe, CoFeNi, CoFe, FeN, FeZrN or the like with a thickness of about 0.01 to 0.6 µm formed by using, for example, a sputtering method. In this case, in the lower magnetic pole part 3401, the saturation magnetic flux density is set to be larger than that in the lower yoke layer 3400, and is set at, for example, at least 2.0 teslas (T) or more.

The upper magnetic pole layer 345 includes an upper magnetic pole part 3450 of which undersurface is in contact with the write gap layer 341, and an upper yoke layer 3451 of which end portion on the ABS 2100 side is in contact with the upper magnetic pole part 3450. The upper magnetic pole part 3450 is constituted of NiFe, CoFeNi, CoFe, FeN, FeZrN or the like with a thickness of about 0.5 to 3 µm formed by using, for example, a sputtering method, or a pattern plating method including a frame plating method. The upper yoke layer 3451 is constituted of NiFe, CoFeNi, CoFe, FeN, FeZrN or the like with a thickness of about 0.5 to 3.0 µm formed by using, for example, a pattern plating method including a frame plating method. In this case, the saturation magnetic flux density of the upper magnetic pole part 3450 is set to be larger than that of the upper yoke layer 3451, and is set at, for example, at least 2.0 T or more.

The lower magnetic pole part 3401 and the upper magnetic pole part 3450 sandwich an end portion of the write gap layer 341 on the ABS 2100 side (on the slider end surface 211 side). A writing operation is performed to a magnetic disk by a leakage magnetic field from the end portion of the write gap layer 341. Coating of extremely thin diamond like carbon (DLC) or the like is applied to the ends reaching the slider end surface 211 of the lower magnetic pole part 3401 and the upper magnetic pole part 3450 for protection.

The write coil insulating layer 344 has the two-layered structure of a lower write coil insulating layer 3440 surrounding a lower write coil layer 3430, and an upper write coil insulating layer 3441 surrounding an upper write coil layer 3431. The write coil insulating layer 344 is provided for electrically insulating the write coil layer 343 from the upper and lower magnetic pole layers 345 and 340. Between the lower write coil layer 3430 and the lower write coil insulating layer 3440, and the upper write coil layer 3431 and the upper write coil insulating layer 3441, an upper and lower coil insulating layer 342 is further provided for electrical insulation between them. The write coil layer 343 has the two-layered structure in the drawing, but may have a single layer, three layers or more, or a helical coil.

Here, the lower write coil layer 3430 and the upper write coil layer 3431 are constituted of Cu or the like with a thickness of about 0.3 to 5 µm formed by using, for example, a frame plating method. The lower write coil insulating layer 3440 and the upper write coil insulating layer 3441 are made of resin layers respectively, and may be constituted of a heat-cured photoresist or the like with a thickness of about 0.5 to 7 µm formed by using, for example, a photolithography method. Further, the write gap layer 341 is an insulating layer, and may be constituted of $Al_2O_3$, $SiO_2$, AlN, DLC or the like with a thickness of about 0.01 to 0.1 µm formed by using, for example, a sputtering method, a CVD method or the like.

The heating part 35 is provided between the MR effect element 33 and the electromagnetic coil element 34, and near the slider end surface 211 as shown in FIG. 4b (and FIG. 4a). The heating part 35 has a heat generating line layer 350 made by causing one line to meander in a rectangular wave form within a layer, and two drawing line layers 351 respectively connected to both ends of the heat generating line layer 350, thus the heating part 35 forms a current path of a predetermined length. One end of each of the drawing line layers 351 is connected to the drive electrode 38 (FIG. 2), and the heating part 35 receives power supply for heat generation from the control circuit 13 (FIG. 1) via the drive electrode 38. The shape of the heat generating line layer 350 is not limited to such a rectangular wave form, but may be, for example, a single line shape, a U-shape, or a spiral shape.

Here, the heat generating line layer 350 has a thickness of, for example, about 0.01 to 5 µm and can be formed from a material including, for example, NiCu, NiCr, Ta, W, Ti, Cu, Au, or NiFe. The drawing line layer 351 may be formed from the same material as the heat generating line layer 350.

Next, returning to FIG. 4a, the slider end surface 211 retreats a little inward from the ABS 2100, and a recess portion 391 is further provided at an end portion of the slider end surface 211 (overcoat layer 39) on the trailing side. By these settings, the thin-film magnetic head 21 can fly above a magnetic disk at a predetermined pitch angle α without causing unnecessary contact during read and write operations.

The abrasion-proof treatment portion 390 is provided at the portion of the slider end surface 211 which contacts a magnetic disk on the occasion of the measurement of flying height, which will be described later, and is the portion to which a very fine embossing work or surface-roughening work as an abrasion-proof treatment is applied. Such work can be performed by irradiating ion beam, for example.

By providing the abrasion-proof treatment portion 390 like this, excessive abrasion and damage of the magnetic disk and the head at the time of touchdown of the thin-film magnetic head 21 on the occasion of the flying height measurement can be prevented, and a measuring method of flying height and a magnetic recording and reproducing method, which will be described in detail later, can be favorably carried out.

Figure 5A:
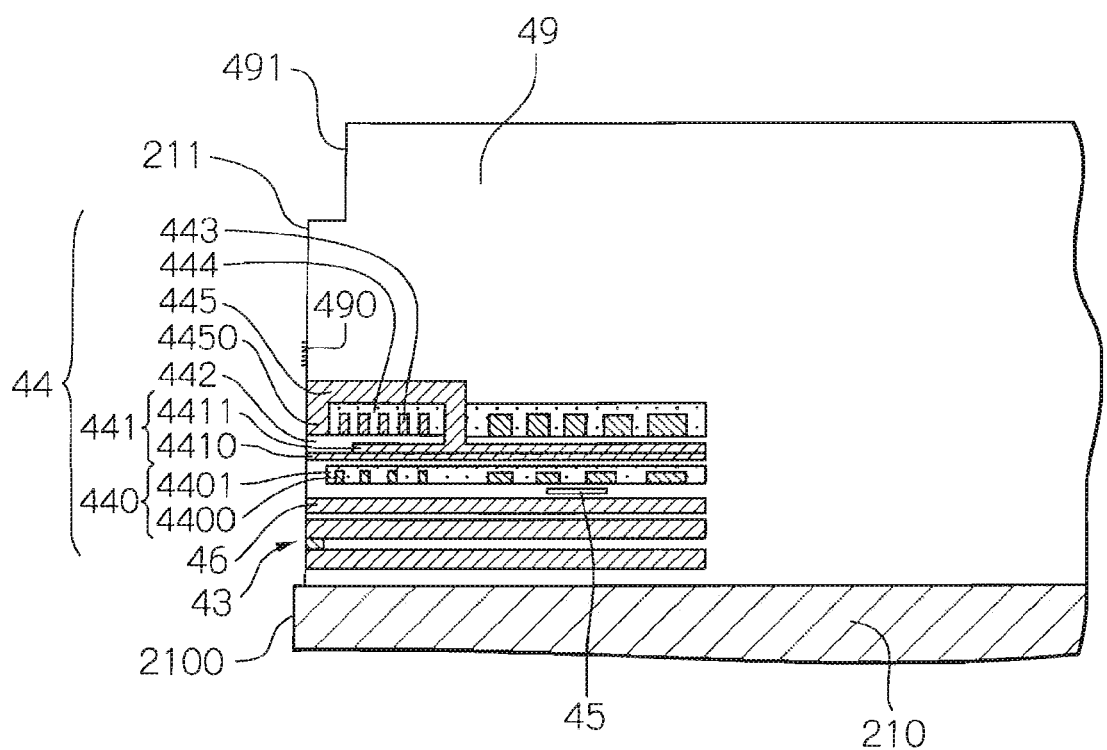
FIGS. 5a and 5b show sectional views taken along the A-A line in FIG. 2, illustrating a main part in another embodiment of the thin-film magnetic head according to the present invention.
Figure 5B:
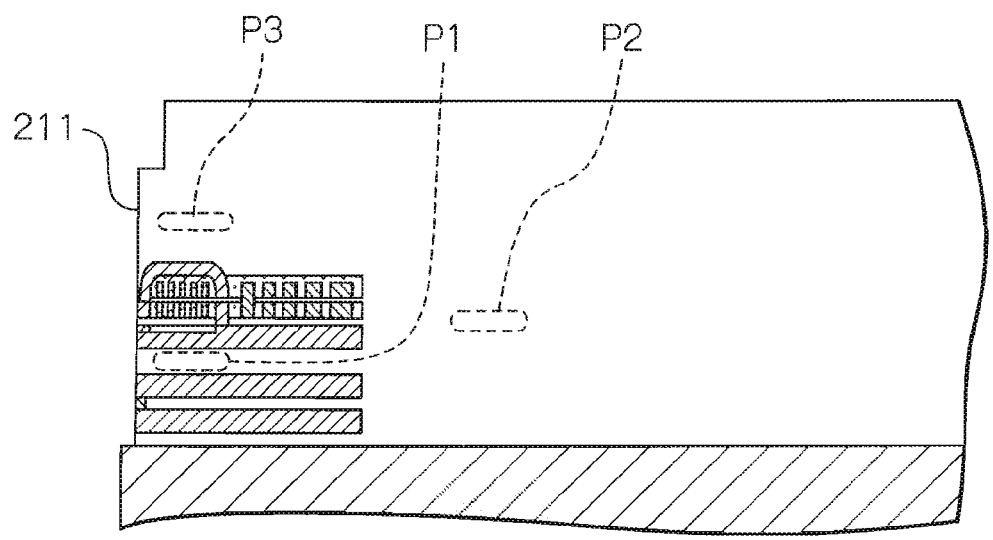

FIGS. 5a and 5b show sectional views taken along the A-A line in FIG. 2, illustrating a main part in another embodiment of the thin-film magnetic head according to the present invention.

According to FIG. 5a, an electromagnetic coil element 44 is for perpendicular magnetic recording, and includes a bucking coil part 440, a main magnetic pole layer 441, a gap layer 442, a write coil layer 443, a write coil insulating layer 444 and an auxiliary magnetic pole layer 445. An inter-element shield layer 46 which functions as a magnetic shield is provided between the electromagnetic coil element 44 and the MR effect element 43. Further, a heating part 45 as a flying-height adjusting element is provided between the electromagnetic coil element 44 and the inter-element shield layer 46 and near the slider end surface 211.

The main magnetic pole layer 441 is a magnetic path for converging and guiding a magnetic flux generated by energization of the write coil layer 443 to a perpendicular magnetic record layer of the magnetic disk to which write operation is performed. The main magnetic pole layer 441 is constituted of a main magnetic pole principal layer 4410 and a main magnetic pole support layer 4411. In this case, the thickness in the end portion on the slider end surface 211 side of the main magnetic pole layer 441 corresponds to the layer thickness of only the main magnetic pole principal layer 4410, thus becomes smaller. As a result, a fine write magnetic field corresponding to high recording density can be generated.

The end portion on the slider end surface 211 side of the auxiliary magnetic pole layer 445 is a trailing shield part 4450 having a wider layer cross-section than that of the other portions of the auxiliary magnetic pole layer 445. The trailing shield part 4450 is opposed to the end portion on the slider end surface 211 side of the main magnetic pole layer 441 through a gap layer 442. By providing the trailing shield part 4450, a magnetic field gradient becomes steeper between the end portion of the trailing shield part 4450 and the end portion of the main magnetic pole layer 441. As a result, jitter of signal output becomes small, and the error rate during reading can be made smaller.

The write coil layer 443 is formed so as to pass at least between the main magnetic pole layer 441 and the auxiliary magnetic pole layer 445 during one turn. The write coil insulating layer 444 surrounds the write coil layer 443, and is provided for electrically insulating the write coil layer 443 from the main magnetic pole layer 441 and the auxiliary magnetic pole layer 445.

In the electromagnetic coil element 44, the bucking coil part 440 is provided between the inter-element shield layer 46 (the heating part 45) and the main magnetic pole layer 441. The bucking coil part 440 is formed of a bucking coil layer 4400 and a bucking coil insulating layer 4401, and generates a magnetic flux which cancels off a magnetic flux loop, which is generated from the main magnetic pole layer 441 and the auxiliary magnetic pole layer 445 and bypasses the upper and lower shield layers in the MR effect element 43, in order to suppress a Wide Area Track Erasure (WATE) phenomenon which is an unnecessary write or erase operation to a magnetic disk.

In FIG. 5a, the head end surface 211 retreats inward from the ABS 2100, and a recess portion 491 is provided at an end portion of the head end surface 211 on the trailing side. Further, the heating part 45 and the abrasion-proof treatment portion 490 are provided at the similar positions to the heating part 35 and the abrasion-proof treatment portion 390 of FIGS. 4a and 4b with the similar constitutions. By them, the thin-film magnetic head can fly over a magnetic disk at a predetermined pitch angle α without causing unnecessary contact during read and write operations. Further, excessive abrasion and damage of the magnetic disk and the head at the time of touchdown of the thin-film magnetic head can be prevented, and a measuring method of flying height and a magnetic recording and reproducing method, which will be described in detail later, can be favorably carried out.

Next, according to FIG. 5b, for example, in the thin-film magnetic heads in FIGS. 4a and 5a, the heating part as a component of the head may be disposed at any position of positions P1 to P3. Specifically, as shown in FIGS. 4a and 5a, it may be disposed at a position (P1) near the slider end surface 211 between the MR effect element and the electromagnetic coil element, it may be disposed at a position (P2) inside the overcoat layer and on the opposite side to the slider end surface 211 with respect to the magnetic head element, or it may be disposed at a position (P3) which is in the overcoat layer, directly above the electromagnetic coil element, and near the slider end surface 211. Especially when the heating part is disposed at the position P1, the efficiency in the protrusion of the magnetic head element end by supplying electric power becomes higher, and favorable protrusion response is obtained, as compared with other positions.

Figure 6:
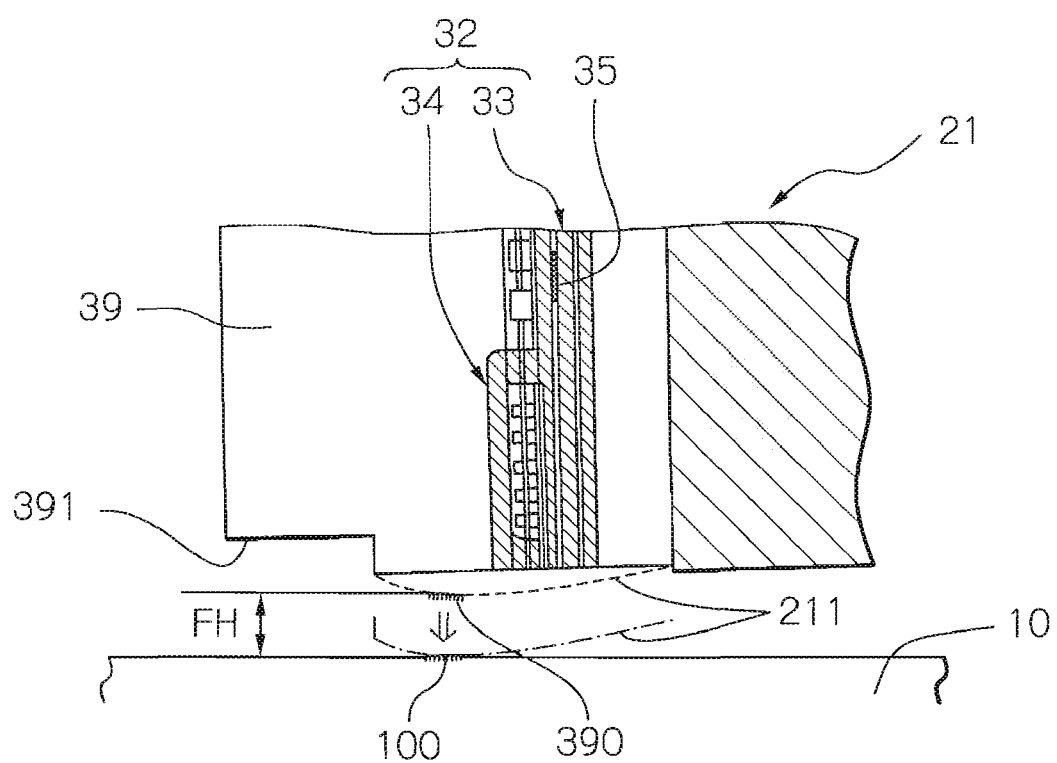
FIG. 6 shows a cross-sectional view taken along the line A-A of FIG. 2 for explaining the definition of flying height, and the operation of the contact lane and the abrasion-proof treatment portion.

FIG. 6 shows a cross-sectional view taken along the line A-A of FIG. 2 for explaining the definition of flying height, and the operation of the contact lane and the abrasion-proof treatment portion.

According to FIG. 6, the end of the magnetic head element 32 protrudes in the direction toward the magnetic disk 10 by driving the heating part 35, and then the thin-film magnetic head 21 is in the state of performing a write or read operation. Here, the smallest space between the protruded slider end surface 211 (shown by the broken line) and the surface of the magnetic disk 10 is flying height FH.

Next, at the time of touchdown of the thin-film magnetic head 21 for flying height measurement, which will be described in detail later, sufficient electric power is supplied to the heating part 35, and thereby, the slider end surface 211 and the surface of the magnetic disk 10, which specify the above described flying height FH, are in contact with each other. The slider end surface 211 in this contact state is shown by the alternate long and short dashed line in FIG. 6. On this occasion, the contact surface of the magnetic disk 10 to the slider end surface 211 is set to be the contact lane 100 to which the above described abrasion-proof treatment is applied, and further, the abrasion-proof treatment portion 390 to which the abrasion-proof treatment is applied as described above is provided on the contact portion of the slider end surface 211. By providing the contact lane 100 and the abrasion-proof treatment portion 390, abrasion involving a fear of bringing about serious problems such as thermal asperity and crash can be avoided. As a result, excessive abrasion and damage of the magnetic disk and the head at the time of touchdown of the thin-film magnetic head 21 can be prevented, and realized is the magnetic disk drive apparatus extremely suitable for carrying out the measuring method of flying height and the magnetic recording and reproducing method, which will be described in detail later.

The abrasion-proof treatment portion 390 is preferably set to be the portion separated from the end of the magnetic head element 32, but may include the end of the magnetic head element 32. The abrasion-proof treatment portion 390, that is, the contact portion at the time of touchdown can be actually set at a predetermined position in the slider end surface 211 by adjusting the degree of retreat of the slider end surface 211, the size and shape of the recess portion 391, the shape of ABS, and the position of the heating part 35 as shown in FIG. 5b.

Figure 7:
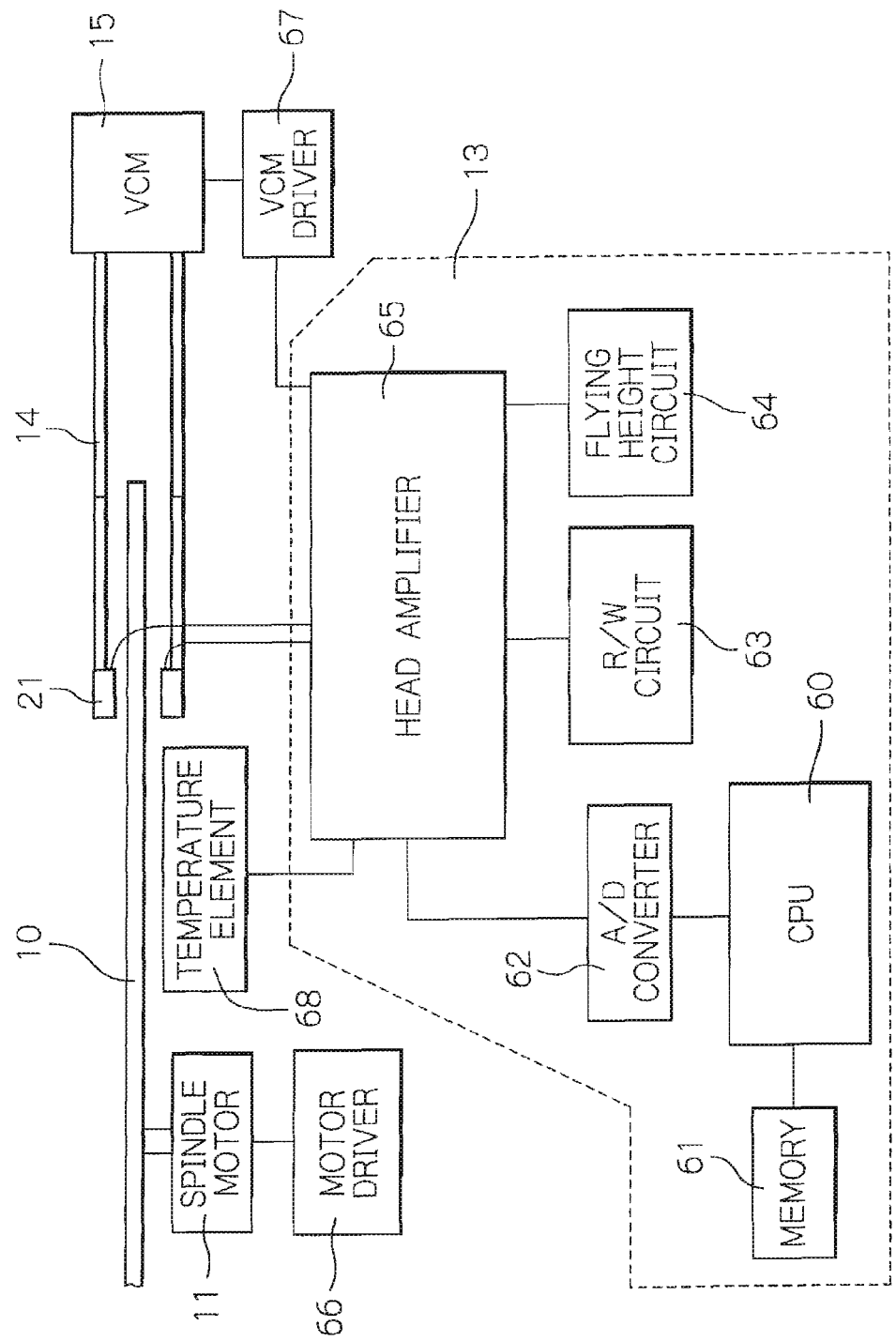
FIG. 7 shows a block diagram illustrating the circuit configuration of a recording/reproducing and flying-height control circuit included by the magnetic disk drive apparatus of FIG. 1.

FIG. 7 shows a block diagram illustrating the circuit configuration of a recording/reproducing and flying-height control circuit 13 included by the magnetic disk drive apparatus of FIG. 1.

In FIG. 7, reference numeral 60 denotes a CPU, reference numeral 61 denotes a memory for storing a control table of current values applied to the heating part 35 used as a flying-height adjusting element, reference numeral 62 denotes an A/D (analogue/digital) converting circuit, reference numeral 63 is an R/W (Read/Write) circuit, reference numeral 64 denotes a flying-height (heating) circuit, reference numeral 65 denotes a head amplifier for controlling recording and reproducing operations, driving operation of the heating part and driving operation of the VCM, reference numeral 66 denotes a motor driver for the spindle motor 11, reference numeral 67 denotes a VCM driver for the VCM, and reference numeral 68 denotes a temperature measuring element.

Of them, the CPU 60, the memory 61, the A/D converting circuit 62, the R/W circuit 63, the flying-height circuit 64 and the head amplifier 65 constitute the recording/reproducing and flying-height control circuit 13.

In the recording and reproducing operations, record data signals from the R/W circuit 63 are transmitted to the thin-film magnetic head 21 through the head amplifier 65 receiving the write command of the CPU 60 via the A/D converting circuit 62. Next, the thin-film magnetic head 21 writes the data signals to the magnetic disk 10 rotating by the spindle motor 11 driven by the motor driver 66. Reproduction data signals which the thin-film magnetic head 21 reads from the rotating magnetic disk 10 is received by the R/W circuit 63 through the head amplifier 65 which receives the read command of the CPU 60. Here, the read/write positions are properly controlled by driving the VCM 15 via the VCM driver 67 by the head amplifier 65 which receives the position command from the CPU 60.

In the touchdown operation of the thin-film magnetic head 21 for the flying height measurement, the head amplifier 65 which receives the command from the CPU 60 drives the VCM 15 via the VCM driver to move the thin-film magnetic head 21 to the contact lane on the magnetic disk 10. Next, the current for generating heat from the flying-height (heating) circuit 64 is applied to the thin-film magnetic head 21 through the head amplifier 65 which receives the touchdown command of the CPU 60. The value of the current for generating heat at this time is set at a value large enough to bring the abrasion-proof treatment portion 390 of the slider end surface 211 and the contact lane 100 of the magnetic disk 100 into contact (touchdown) with each other reliably, as shown in FIG. 6. Here, the read output signals of the MR effect element at the time of touchdown and during flying are sent to the R/W circuit via the head amplifier 65.

The read output signal during flying can be read before or after touchdown, in the state in which the heating part does not generate heat and the thin-film magnetic head is stably flying.

In the flying-height adjusting (heating) operation, the current for generating heat from the flying-height (heating) circuit 64 is applied to the thin-film magnetic head 21 through the head amplifier 65 which receives the heating command of the CPU 60. The value of the current for heating on this occasion is controlled by referring to the temperature measured by the temperature measuring element 68 and using the control table with the current value for generating heat which the memory 61 has. Here, the control table is properly updated by the aforementioned read output signal values at the time of touchdown and at the time of flying. As the current for generating heat, not only a direct current, but also an alternating current, a pulse current or the like can be used.

When the electrostrictive element 26 shown in the embodiment of FIG. 3 is used as the flying-height adjusting element instead of the heating part 35, the applied voltage is controlled by using the control table of the applied voltage values to the electrostrictive element 26 in the memory 61, and thus, flying height is adjusted. The flying height can be adjusted by using the heating part 35 and the electrostrictive element 26 in combination, and using the control tables for both of them.

Figure 8:
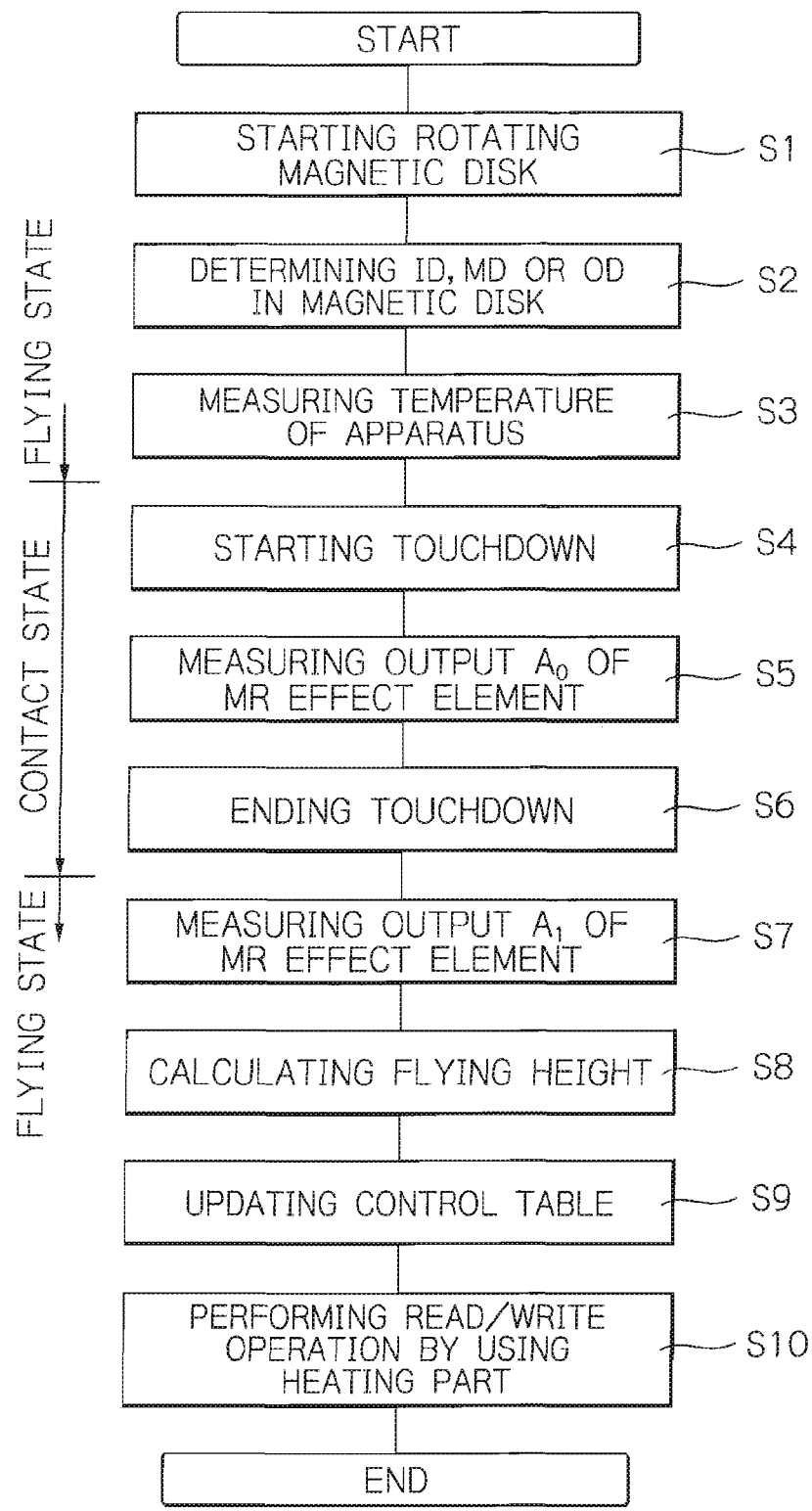
FIG. 8 shows a flowchart illustrating one embodiment of the measuring method of flying height and the magnetic recording and reproducing method according to the present invention.

FIG. 8 shows a flowchart illustrating one embodiment of the measuring method of flying height and the magnetic recording and reproducing method according to the present invention.

First, by rotating the magnetic disk, the thin-film magnetic head is brought into a normal flying state (step 1). Next, when the flying state of the thin-film magnetic head becomes stable, determination of the position of the thin-film magnetic head in the magnetic disk, that is, whether the outer peripheral side, the intermediate position or the inner peripheral side, is performed (step 2). Next, the temperature of the atmosphere in the apparatus is measured (step 3). Thereafter, touchdown of the thin-film magnetic head is started (step 4). Here, a read output $A_0$ of the MR effect element in the state where the thin-film magnetic head and the magnetic disk are in contact with each other is measured (step 5). Next, the touchdown of the thin-film magnetic head is finished (step 6). The time from the start to the end of this touchdown is, for example, about 0.05 to 1 msec (millisecond). Thereafter, when the flying state of the thin-film magnetic head becomes stable, the read output $A_1$ of the MR effect element in this flying state is measured (step 7). The measurement at step 7 may be performed between step 3 and step 4, that is, immediately before the touchdown.

Next, from the difference $A_0-A_1$ between the read outputs at the time of the touchdown and at the time of flying, the flying height FH ($P_H$, $T_A$) under the condition of the position $P_H$ of the thin-film magnetic head obtained in step 2 and the temperature measurement value $T_A$ obtained in step 3 is calculated (step 8). For the calculation, used is the sensitivity characteristic in magnetic field detection of the MR effect element. Next, by using the measured flying height FH ($P_H$, $T_A$), the control table which the memory 61 (FIG. 7) has is updated (step 9). Finally, desired flying height is realized by causing the heating part as the flying-height adjusting element to generate heat with use of the updated control table, and by protruding the magnetic head element under control, and then, a write/read operation is performed (step 10).

Of the above, steps 1 to 9 correspond to the flying height measuring method, and the flying height FH calculated at step 9 becomes the measurement value. The sequence of the measurement of the position $P_H$ of the thin-film magnetic head (step 2) and the measurement of the temperature $T_A$ in the apparatus (step 3) is not necessarily limited to the above described sequence, but they may be carried out, for example, after step 9, that is, after the measurement of the flying height.

In the actual use of the magnetic disk drive apparatus, the measurement of the flying height may be performed at the time of start, or may be performed periodically, at random, or before a proper read or write operation.

Here, the example of actually performing update (step 9) of the control table will be shown.

First, the used thin-film magnetic head was one having the following characteristics.

The protrusion efficiency of the magnetic head element end with respect to the input electric power to the heating part: 0.10 nm/mW The protrusion amount of the magnetic head element end per temperature: 0.05 nm/° C.

The protrusion amount of the magnetic head element end by a write current during writing: 1.0 nm The set value of the flying height during reading and writing was 3.0 nm.

Next, when the magnetic disk drive apparatus including this thin-film magnetic head was brought into the test room with about 0 m above the sea level and an atmospheric pressure of about 101.3 kPa (1.0 atm (atmospheric pressure)), and then, the flying height in the case of the temperature inside the apparatus being the room temperature (25° C.) was measured by the above described measuring method of flying height according to the present invention. the result was FH=10.0 nm. A part of the control table in this case is shown in Table 1.

TABLE 1

| | Temperature within apparatus | | |
|---|---|---|---|
| | −20° C. | 25° C. | 80° C. |
| Flying height during heating part OFF (nm) | 7.75 | 10.0 | 12.75 |
| Input power required during reading (mW) | 47.5 | 70.0 | 97.5 |
| Input power required during writing (mW) | 37.5 | 60.0 | 87.5 |

The reason why at each temperature in Table 1, the input electric power required during writing is smaller than the input electric power required during writing by 10.0 mW is that, during writing, the protrusion amount (1.0 nm) is generated from the thermal expansion of the electromagnetic coil element itself by the heat generation due to the write current, and therefore, the magnetic head element end is protruded by the heat generation from the heating part by only the remaining amount as a result of subtracting that amount (1.0 nm) from the total amount of the required heat.

Next, when the identical magnetic disk drive apparatus having this control table was brought into the test room in the highland with the atmospheric pressure of about 70.9 kPa (0.7 atm) from the aforementioned test room with the atmospheric pressure of about 101.3 kPa (1.0 atm), and then, the flying height FH in the case of the temperature inside the apparatus being the room temperature (25° C.) was measured by the aforementioned measuring method of flying height according to the present invention. The result was FH=7.0 nm. Next, by using the flying height measurement value FH, the aforementioned control table was updated. A part of the control table after the update is shown in Table 2.

TABLE 2

| | Temperature within apparatus | | |
|---|---|---|---|
| | −20° C. | 25° C. | 80° C. |
| Flying height during heating part OFF (nm) | 4.75 | 7.0 | 9.75 |
| Input power required during reading (mW) | 17.5 | 40.0 | 67.5 |
| Input power required during writing (mW) | 7.5 | 30.0 | 57.5 |

In the Table 2, the value of the flying height in the state of the heating part being OFF is the value obtained by multiplying each of the corresponding values in Table 1 by 7.0 nm/10.0 nm=0.70 which is the ratio of the flying height measurement value.

As is understood by comparing Table 1 and Table 2, the suitable data of the control table greatly depends on a change in atmospheric pressure. In the use environment of the highland with −20° C. of Table 2, 7.5 mW is actually sufficient for the input electric power value required during writing. However, if Table 1 is directly used without considering the atmospheric pressure change unlike the present invention, electric power of 37.5 mW is inputted. As a result, the risk of thermal asperity and crash by the contact of the head and the magnetic disk becomes rather high.

As described above, according to the magnetic recording and reproducing method of the present invention, the control table which becomes the reference when controlling the heating part as the flying-height adjusting element can be properly updated in accordance with the use environment, especially the atmospheric pressure. As a result, a stable and desired flying height can be always obtained during read and write operations of the head, and therefore, the stable and favorable recording and reproducing characteristics without being influenced by the use environment can be obtained.

According to the flying-height measuring method and the magnetic recording and reproducing method according to the present invention, it is understood that the flying height of the thin-film magnetic head can be properly measured and adjusted without using a new component contradicting the demand of reduction in cost and size, such as an atmospheric pressure sensor.

In the magnetic recording and reproducing method according to the present invention, the flying height is not adjusted in accordance with only the change in atmospheric pressure, but a suitable magnetic recording and reproducing environment is realized by properly measuring the flying height including all the influences of the environmental parameters such as atmospheric pressure, without measuring each of the values of the environmental parameters. Accordingly, it becomes possible to respond to the other environmental factors, for example, the environment in which a constant vibration or acceleration is applied.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A measuring method of flying height of a thin-film magnetic head, comprising the steps of:

causing a thin-film magnetic head including a read head element receiving a signal magnetic field from a magnetic disk to contact a rotating contact lane provided on a surface portion of the magnetic disk temporarily by supplying electric power to a flying-height adjusting element provided within said thin-film magnetic head or mounted to said thin-film magnetic head;

measuring an output from said read head element at a time of the contact;

causing said thin-film magnetic head to fly above the rotating magnetic disk thereafter;

measuring an output from said read head element during the flying of said thin-film magnetic head; and measuring a flying height of said thin-film magnetic head by calculating a difference between the output from said read head element at a time of the contact and the output from said read head element during the flying.

2. The measuring method of flying height as claimed in claim 1, wherein a heating part is used as said flying-height adjusting element.

3. The measuring method of flying height as claimed in claim 1, wherein the flying height of said thin-film magnetic head, which changes depending on atmospheric pressure in a use environment of an apparatus provided with said thin-film magnetic head, is measured.

4. A magnetic recording and reproducing method, comprising the steps of:
  causing a thin-film magnetic head including a read head element receiving a signal magnetic field from a magnetic disk to contact a rotating contact lane provided on a surface portion of the magnetic disk temporarily by supplying electric power to a flying-height adjusting element provided within said thin-film magnetic head or mounted to said thin-film magnetic head;
  measuring an output from said read head element at a time of the contact;
  causing said thin-film magnetic head to fly above the rotating magnetic disk thereafter;
  measuring an output from said read head element during the flying of said thin-film magnetic head;
  measuring a flying height of said thin-film magnetic head by calculating a difference between the output from said read head element at a time of the contact and the output from said read head element during the flying;
  adjusting the flying height of said thin-film magnetic head to a predetermined value based on the measured value of the flying height; and
  performing read and/or write operation by using said thin-film magnetic head.

5. The magnetic recording and reproducing method as claimed in claim 4, wherein a heating part is used as said flying-height adjusting element.

6. The magnetic recording and reproducing method as claimed in claim 4, wherein a temperature within an apparatus provided with at least one said thin-film magnetic head is measured during measuring the flying height and during adjusting the flying height, and then, based on the measured values of the temperature and the measured value of the flying height, the flying height of said thin-film magnetic head is adjusted to a predetermined value.

7. The magnetic recording and reproducing method as claimed in claim 6, wherein the flying height of said thin-film magnetic head is adjusted, based further on the amount of protrusion during writing by a heat generated from an electromagnetic coil element comprised by said thin-film magnetic head.

8. The magnetic recording and reproducing method as claimed in claim 6, wherein the adjustment of the flying height is performed by controlling an electric power inputted to a flying-height adjusting element provided within said thin-film magnetic head or mounted to said thin-film magnetic head, and on controlling the electric power, a control table is used, which describes a relationship between the electric power and the flying height of said thin-film magnetic head at various temperatures within said apparatus.

9. The magnetic recording and reproducing method as claimed in claim 8, wherein said control table is updated by using the measured value of the flying height.

10. The magnetic recording and reproducing method as claimed in claim 8, wherein a heating part is used as said flying-height adjusting element.

11. The magnetic recording and reproducing method as claimed in claim 4, wherein the flying height of said thin-film magnetic head, which changes depending on atmospheric pressure in a use environment of an apparatus provided with said thin-film magnetic head, is measured, the flying height of said thin-film magnetic head is adjusted to a predetermined value based on the measured value of the flying height, a change of the flying height by the atmospheric pressure is compensated, and then, said read and/or write operation is performed.

12. A magnetic disk drive apparatus comprising:
  at least one magnetic disk;
  at least one head gimbal assembly, said head gimbal assembly comprising:
    a thin-film magnetic head comprising: a read head element for receiving a signal magnetic field from the magnetic disk; and a write head element for generating a signal magnetic field to perform write operation to the magnetic disk; and
    a flying-height adjusting element provided within said thin-film magnetic head or mounted to said thin-film magnetic head, for adjusting a spacing between a surface of the magnetic disk and ends of said read head element and said write head element, based on a value of a flying height obtained by measuring an output from said read head element at a time of a contact of thin-film magnetic head with the rotating magnetic disk, the contact being carried out by supplying electric power to said flying-height adjusting element, measuring an output from said read head element during flying of said thin-film magnetic head, and then calculating a difference between the output from said read head element at a time of the contact and the output from said read head element during the flying; and
  a control circuit for controlling write and read operations performed to the magnetic disk by said thin-film magnetic head and for controlling an operation of obtaining the flying height by measuring the outputs from said read head element at a time of the contact and during flying of said thin-film magnetic head and an adjusting operation of said flying-height adjusting element, and
  said at least one magnetic disk including at least one contact lane on a surface portion of itself which said thin-film magnetic head contacts when measuring the flying height.

13. The magnetic disk drive apparatus as claimed in claim 12, wherein said at least one contact lane is provided in a region other than data signal regions and servo signal regions on the magnetic disk.

14. The magnetic disk drive apparatus as claimed in claim 12, wherein a surface of the contact lane is a surface to which embossing work or surface-roughening work is applied.

15. The magnetic disk drive apparatus as claimed in claim 12, wherein said thin-film magnetic head comprises an abrasion-proof treatment portion to which abrasion-proof treatment is applied, in a contact portion of said thin-film magnetic head when contacting the magnetic disk for measuring the flying height.

16. The magnetic disk drive apparatus as claimed in claim 15, wherein said abrasion-proof treatment portion is formed by applying embossing work or surface-roughening work to said contact portion.

17. The magnetic disk drive apparatus as claimed in claim 12, wherein said flying-height adjusting element is a heating part provided within said thin-film magnetic head.

* * * * *